United States Patent
Boudou et al.

(10) Patent No.: US 7,363,293 B2
(45) Date of Patent: Apr. 22, 2008

(54) ACCESS CONTROL METHOD AND DEVICE IN AN EMBEDDED SYSTEM

(75) Inventors: Alain Boudou, Vert (FR); Christoph Siegelin, Paris (FR); Jean-Claude Marchetaux, La Queue Lez Yvelines (FR)

(73) Assignee: Axalto SA, Meudon (FR)

( * ) Notice: Subject to any disclaimer, the term of this patent is extended or adjusted under 35 U.S.C. 154(b) by 196 days.

(21) Appl. No.: 10/497,738

(22) PCT Filed: Dec. 11, 2002

(86) PCT No.: PCT/IB02/05294

§ 371 (c)(1),
(2), (4) Date: Jun. 4, 2004

(87) PCT Pub. No.: WO03/050686

PCT Pub. Date: Jun. 19, 2003

(65) Prior Publication Data
US 2005/0005079 A1    Jan. 6, 2005

(30) Foreign Application Priority Data
Dec. 12, 2001 (FR) .................................. 01 16054

(51) Int. Cl.
*G06F 12/00* (2006.01)

(52) U.S. Cl. .................. 707/3; 707/1; 707/2; 707/4
(58) Field of Classification Search ................ 711/146, 711/172, 206; 345/424; 707/1–4
See application file for complete search history.

(56) References Cited

U.S. PATENT DOCUMENTS

| 5,229,652 | A | * | 7/1993 | Hough | 307/104 |
| 5,452,431 | A | * | 9/1995 | Bournas | 711/115 |
| 5,569,897 | A | * | 10/1996 | Masuda | 235/379 |
| 5,578,808 | A | * | 11/1996 | Taylor | 235/380 |
| 5,912,453 | A | * | 6/1999 | Gungl et al. | 235/492 |
| 6,754,886 | B1 | * | 6/2004 | Merk et al. | 717/116 |
| 6,925,569 | B2 | * | 8/2005 | Wuidart | 713/193 |

* cited by examiner

*Primary Examiner*—Sathyanarayan Pannala
(74) *Attorney, Agent, or Firm*—Pehr Jansson; The Jansson Firm

(57) ABSTRACT

A method and device to control the access to a data memory space of a computer system by an active process stored in a program space of the system. When the active process attempts to perform an operation on a part of the data memory space the method or device controls the access to the part of the data memory space by comparing a dynamic attribute linked to the active process to an attribute linked to the part of the data memory space the process is attempting access. The value of the dynamic attribute is updated according to the present and previous status of the active process.

13 Claims, 6 Drawing Sheets

ACCESS CONTROL METHOD AND DEVICE IN AN EMBEDDED SYSTEM

BACKGROUND OF THE INVENTION

1. Field of the Invention

This invention concerns a method and a device to control the access to memory areas attached to applications and software modules of an electronic unit with microprocessor, in particular a microcontroller. The invention is for example applicable to, but not limited to, electronic smartcards.

2. Related Art

The smartcard like all embedded computer systems includes a processor, inputs/outputs and memory which is divided into non-volatile memory generally used to store programs and data, and volatile memory generally used as processing memory. The embedded systems or portable objects and in particular the smartcards are now performing more and more complex functions due, in particular, to the storage of multiple-application programs: these smartcards are designated by the term "multi-application smartcard".

Regarding the security of multi-application smartcards, isolation of the applications from each other plays an essential role. In a smartcard containing several applications therefore, it is important to be able to deny applications access to data, which does not belong to such applications to prevent malicious use or transmission of information to the outside. For example, it may be necessary to deny a first application access to confidential data belonging to a second application such as cryptographic keys. In particular, because the data is stored permanently in non-volatile memory, it may be necessary to restrict reading and updating to authorized applications only.

In addition, due to the increase in memory capacity and processing power of the smartcards, software architecture is becoming more structured, with functions isolated from each other as modules and distributed on various levels.

For example, therefore, in a software architecture for smartcards, we can identify, as shown on FIG. 1, the core layer "CORE" interfacing directly with the hardware (and comprising in particular the generic non-volatile memory access routines), the system layer "OS" concerning the operating system which manages the shared resources and services, and the application layer "APPLI" grouping various software applications. Each layer can be subdivided into sub-layers and functional modules: the system layer includes, for example, functional modules such as the cryptographic algorithm processing service, management of memory and input/output resources.

In this type of model, an application no longer accesses its data in memory directly, but via functions located in the core and system layers. The problem of restricting access to stored data to authorized applications only arises, in particular, in this context of indirect accesses.

More generally, a multi-layer modular software architecture can be designed in which, firstly, a module calls one or more modules to execute some of its tasks and secondly each module has a program and data stored in non-volatile memory in clearly defined areas, i.e., data for which the handling or use must be restricted to authorized modules only.

Generally, memory protection mechanisms can be produced in a software and/or hardware form for interpreted applications and in a hardware form for executed applications as windows opened on the memory (such as a segmentation device) or as semi-static access matrices. Applications are associated with memory areas either during configuration or when activating an application. Such mechanisms only allow memory access for predetermined code/data area pairs.

For example, with an access matrix, memory pages are associated with applications, when the card is configured, by programming page attributes; the role of the hardware at the time of execution is limited to a simple comparison between the identity of the page "owner" of a page being accessed and the identity of the module trying to access the page (known by the hardware, for example, by the position of the program counter). The disadvantage with these access matrix mechanisms arises from the fact that these mechanisms require a direct relationship between program and data: this relation exists as long as the page owner accesses its data directly (via the microprocessor read/write instructions), but this direct relationship between processing and data disappears in configurations where a module other than the owner of a data area attempts to access the data using the owner's name ("in its name"). Two examples illustrating this situation are (i) a virtual machine which accesses the data of applications "in their names" and (ii) an EEPROM manager module between the application and the non-volatile memory. These, "indirect relation" accesses cannot be protected by access matrix type devices.

The invention aims to overcome the disadvantages of the devices and systems of the known state of the art while meeting the requirements, which arise for example, from "indirect relation" access.

In the context of a multi-layer modular software architecture of a computer system and more particularly, in the following description of an embedded system such as a smartcard, the objective of the invention is therefore to provide a method capable of isolating and protecting memory areas attached to said modules.

Still in this context, the objective of the invention is to provide a method capable of controlling the access to the memory and of restricting access to authorized modules only.

SUMMARY OF THE INVENTION

This invention concerns a method to control the access to objects stored in a memory space of a computer system by an active process stored in a program space of said system, the active process attempting to perform an operation on the objects. The method and device of the invention controls access to the objects via a dynamic attribute linked to the active process whose value is updated according to the present and previous status of the active process.

In an embodiment of the invention the dynamic attribute is an item of information of type memory address(es) or an item of information of type identifier.

In one embodiment the active process attribute is authorized space for the active process. This authorized space may either be explicitly or implicitly updated. In an embodiment wherein the authorized space is explicitly updated, the data space of the active process is explicitly added (or removed) by request by a module of an active process to add or remove a given space from the authorized spaces.

This invention also concerns an access control device implementing the method described above as well as an embedded system using such a device. It also concerns the program implementing said method.

BRIEF DESCRIPTION OF THE DRAWINGS

The invention will now be described in more detail, referring to the attached drawings, in which.

DETAILED DESCRIPTION OF THE INVENTION

Figure 1:
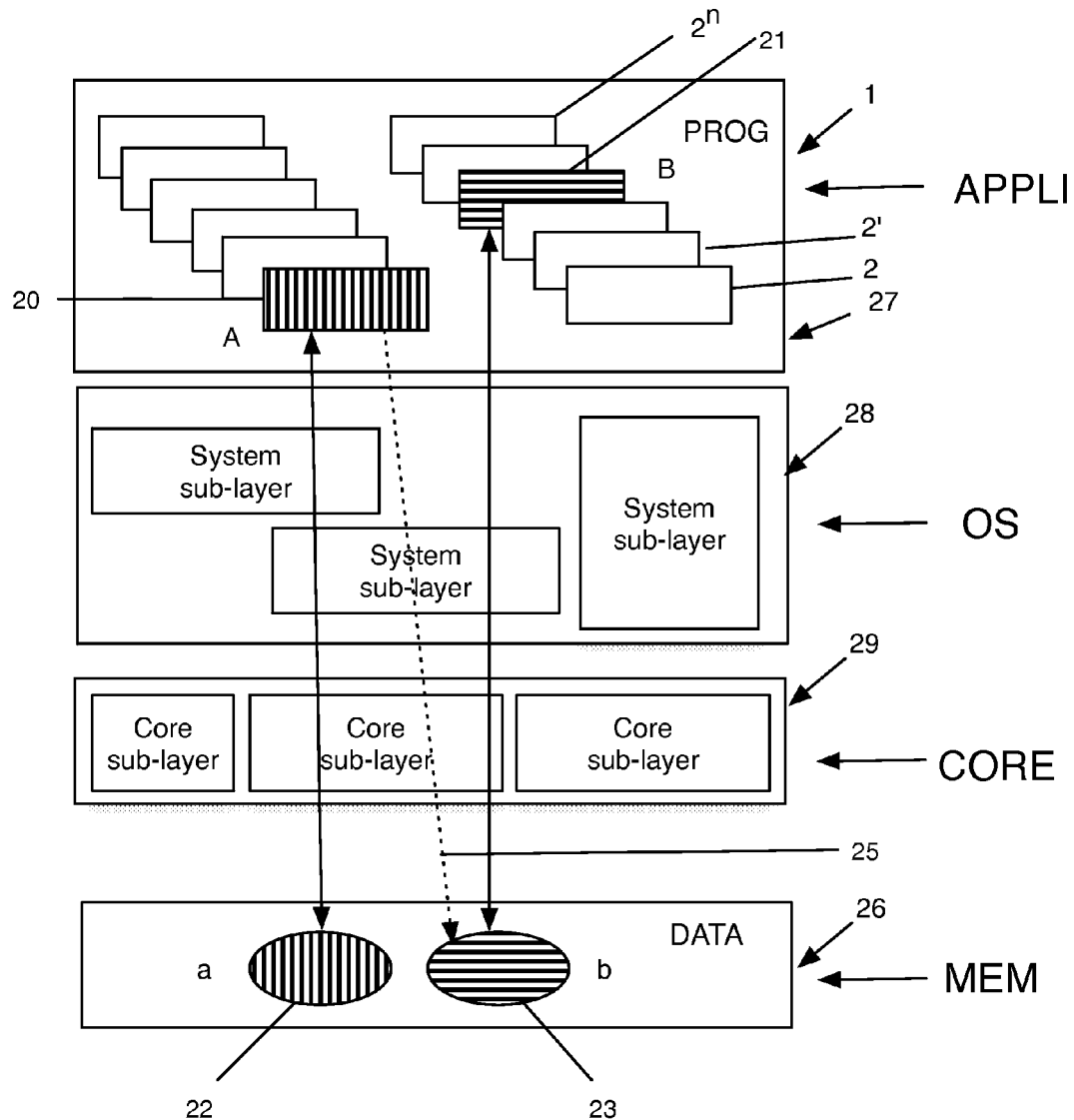
FIG. 1 is a diagrammatic representation of a multi-layer modular software architecture of a computer system.

In a computer system 1 having a multi-layer modular software architecture as illustrated by FIG. 1, a module 2 (e.g., module 2, 2', or 2" (each of which is referred to as module 2, hereinbelow), completes a specified task either upon request from outside the computer system using a set of input/output commands, upon request by another module, or following a hardware event. A module 2 capable of executing a task upon request from outside the computer system is hereafter referred to as an application. Execution of said task corresponds to execution of a series of instructions called a program (A, B), which are stored in non-volatile memory in a space 1, called "PROG" space (program memory space) in a portion of the space 1 specific to said module corresponding to such externally callable modules. The series of instructions of a module applies itself to a set of data stored in non-volatile memory in another space 26, called "DATA" space (data memory space), respectively the spaces a 22 and b 23 for the programs A and B. The data spaces a 22 and b 23 consist in spaces for which said modules 20 and 21 have access rights, respectively. As an illustration, in FIG. 1, activation of module 20 corresponds to execution of program A stored in the program space PROG; said program A applies to data stored in the data space a 22. If module 20 also has a right granted by module 21, the program A of the module 20 may also access the data space b 23 of module 21 (illustrated by dotted arrow 25 on FIG. 1).

While executing its task, one module 2 can call other modules 2. Consequently, the programs corresponding to those modules are executed successively, and the called module follows the calling module.

In the context of system 1 described above, the method according to the invention consists not only of isolating the various software applications but also of isolating each module 2 in the system 1 (irrespective of its level). Accordingly, the method must ensure that a module 2 in the application layer 27 cannot access data the module 2 is not authorized to access via calls to modules in lower layers 28 and 29. The method according to the invention must therefore restrict access to memory spaces authorized such that for any given memory space only modules 2 authorized access thereto are able to access such memory space.

Figure 2:
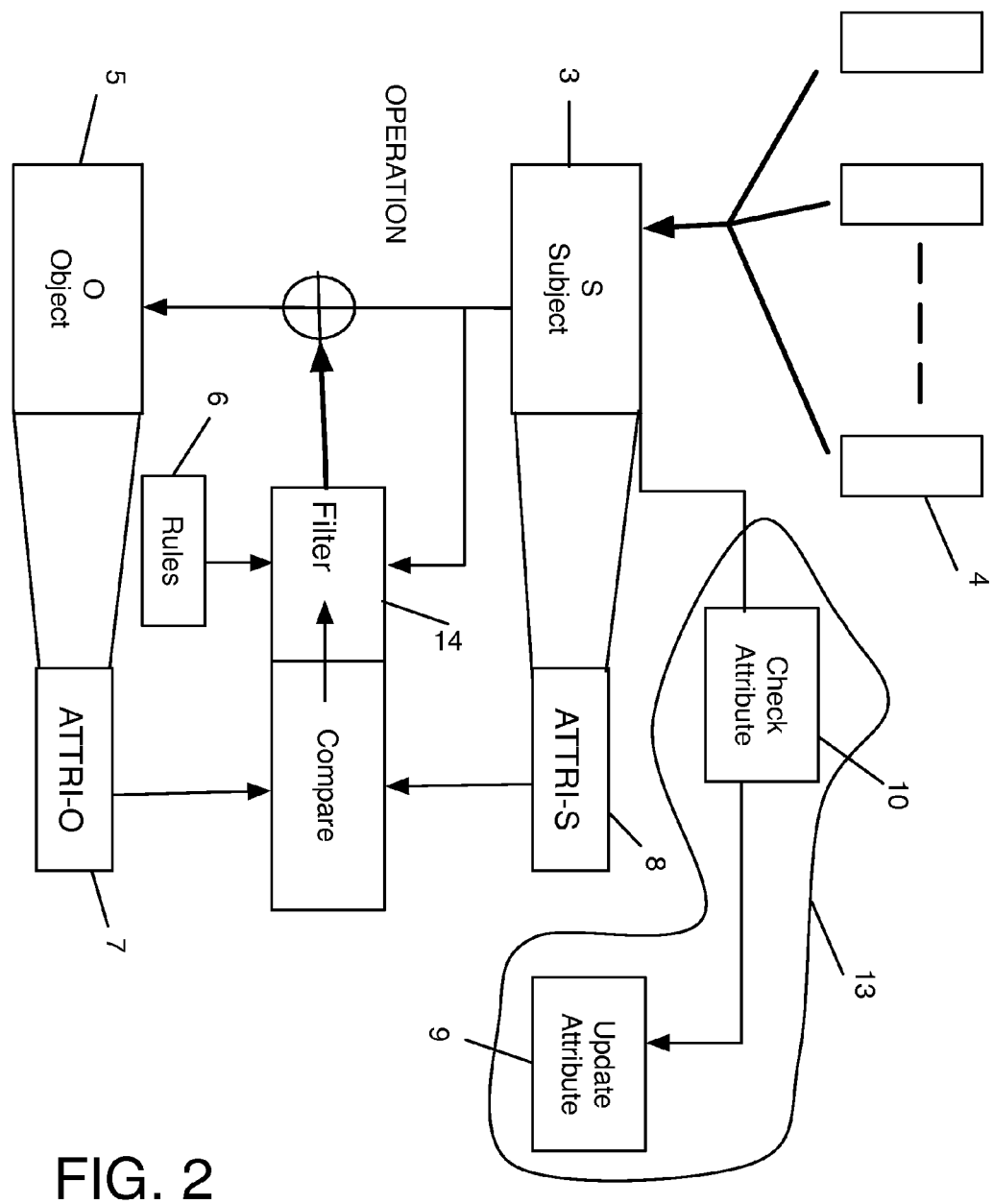
FIG. 2 is a flowchart illustrating the main steps of one form of realization of the access control method according to this invention.

The notion of access control is illustrated in FIG. 2. An access control accepts or rejects an operation carried out by an active entity 3 known as the active process "S" 3 stored in the space PROG 1 (for example, a processing process) executing in the name of a user 4, on passive entities 5 known as objects "O" 5 of the memory space DATA 26 (for example, a container of stored data) or PROG 1 according to rules 6 characterizing the policy applied, security attributes 7, 8 associated firstly with the targeted passive entity 5 and secondly with the active process 3 executing for a user 4 and the type of operation. The active process consists of one or more modules 2 executed successively to perform a given operation.

Embedded software such as that of, for example, multi-application smartcards, can be described as an active process 3 which, firstly, runs for external users 4 addressing the various applications, and, secondly, carries out access type operations in non-volatile memory. In the context of this embedded software modular architecture, the invention proposes a method and a device to control the access to objects 5 by an operation of an active process 3. The method and device characterized is based on dynamic attribute (ATTRI-S) 8 linked to the active process 3, whose value depends on the history of the active process 3, i.e., on the present and past status of the active process 3. The method restricts the access to objects 5 to authorized modules 2 only, even when these accesses are indirect, i.e., occurring via one or more other modules 2.

The method includes the following steps:

- a management step 9 to manage the active process attribute 8, according to the present status and past status of the active process 3;
- a compare step 12 to compare an item of information (ATTRI-O 7) characterizing the targeted object 5, the item of information being the attribute 7 corresponding to the object, to an item of information (ATTRI-S 8) characterizing the present status and the past status of the active process 3, that item of information being the active process attribute 8;
- a filtering step 14 to accept or reject the operation depending on said comparison and optionally on the type of operation and/or on predefined rules 6.

In the following description, the method according to the invention will be described in detail in its application to the data space DATA 26, i.e., the targeted object 5 is part of said space DATA 26. So that the method according to the invention is easier to understand, the management step will be described after the description of the comparison step 12 and the filtering step 14.

The comparison step 12 consists more precisely in comparing an item of information (ATTRI-O) 7 characterizing the targeted object 5 in the memory area DATA 26, i.e., more precisely the targeted data space (called targeted space), e.g., data space 22 or data space 23, and an item of information (ATTRI-S) 8 characterizing the data space associated with the present and past status of the current active process 3 (called authorized space).

The targeted object 5 is identified by an object attribute (ATTRI-O) 7. According to a first realization variant, the object attribute 7 is an item of information associated with an operation. According to a second variant, the attribute 7 is an item of information physically associated with the targeted memory area (form of realization on FIG. 2). The authorized space is characterized by an active process attribute 8 corresponding to the accessing active process 3. The attribute 8 corresponding to the active process 3, and which is of the same type as the type used for the attribute 7, corresponding to the targeted data space thereby, simplifying the comparison. In the first realization, the attribute is a memory address according to the known model MMU (Memory Management Unit); the current operation specifies a memory address which the active process 3 attempts to access. The comparison then consists in checking that the address stored in the attribute ATTRI-O 7 in question is contained in a window of addresses stored in the attribute ATTRI-S 8, the address window corresponding to the authorized space. In the second realization variant, the current operation selects an attribute ATTRI-O 7 which specifies an identifier. The comparison consists in checking the identity between the identifier stored in the object attribute ATTRI-O 7 of the targeted passive entity 5 and an identifier stored in the active process attribute ATTRI-S 8 of the authorized space (model MAC-Mandatory Access Control).

The filtering step 14 consists in performing an action depending on the result of the comparison step, i.e., accept the operation if the object 5 targeted by the operation (the targeted space) and the data space for which access is authorized at the time of the operation (the authorized space) correspond, or otherwise reject the operation. Other characteristics may also be taken into consideration such as the type of operation. This may be used to extend the qualification of the access to the targeted space, for example, the targeted space accessible in read only mode. Other examples of possible qualifications include read, write, programming (writing of 1), erase (writing of 0), or combination of these terms, supply with instructions. Additional rules 6 may also be imposed. For example, access may only be granted to one or several predetermined modules, this restriction applying in addition to the filtering depending on the result of the comparison between the targeted space and the authorized space.

The management step 13 consists of managing the information characterizing the authorized data space associated with the current program status of the active process 3. The management step consists of calling a mechanism 9 to initialized (considered in this description as an initial update) and update the authorized space for the active process 3. The authorized space is initialized or reinitialized on each change of application (e.g., in a change to application A on FIG. 4, the modules M1, M2, M3 not being applications but simple modules activated to process a task upon request by another module).

Said management depends on the functional characteristics of the architecture and the security policy to be implemented.

In the context of an embedded software modular architecture in which a module can call another module to subcontract a task, the program of the called module can access its own data and also has the privilege of being able to access the data of the data space belonging to the calling module. During a succession of inter-module calls, the privilege is inherited from one module to another. Consequently, a given data space can be accessed by an entire series of modules. In addition to its own data space, a program of a called module can therefore also access the data space of any of the earlier calling modules or of several of them.

Any data handling or use is restricted to the authorized modules only. The access control method according to the invention accepts or rejects operations on data stored in non-volatile memory depending on the chaining of inter-module calls and on the choices of each program to access its own data in a transitory way.

Figure 3:
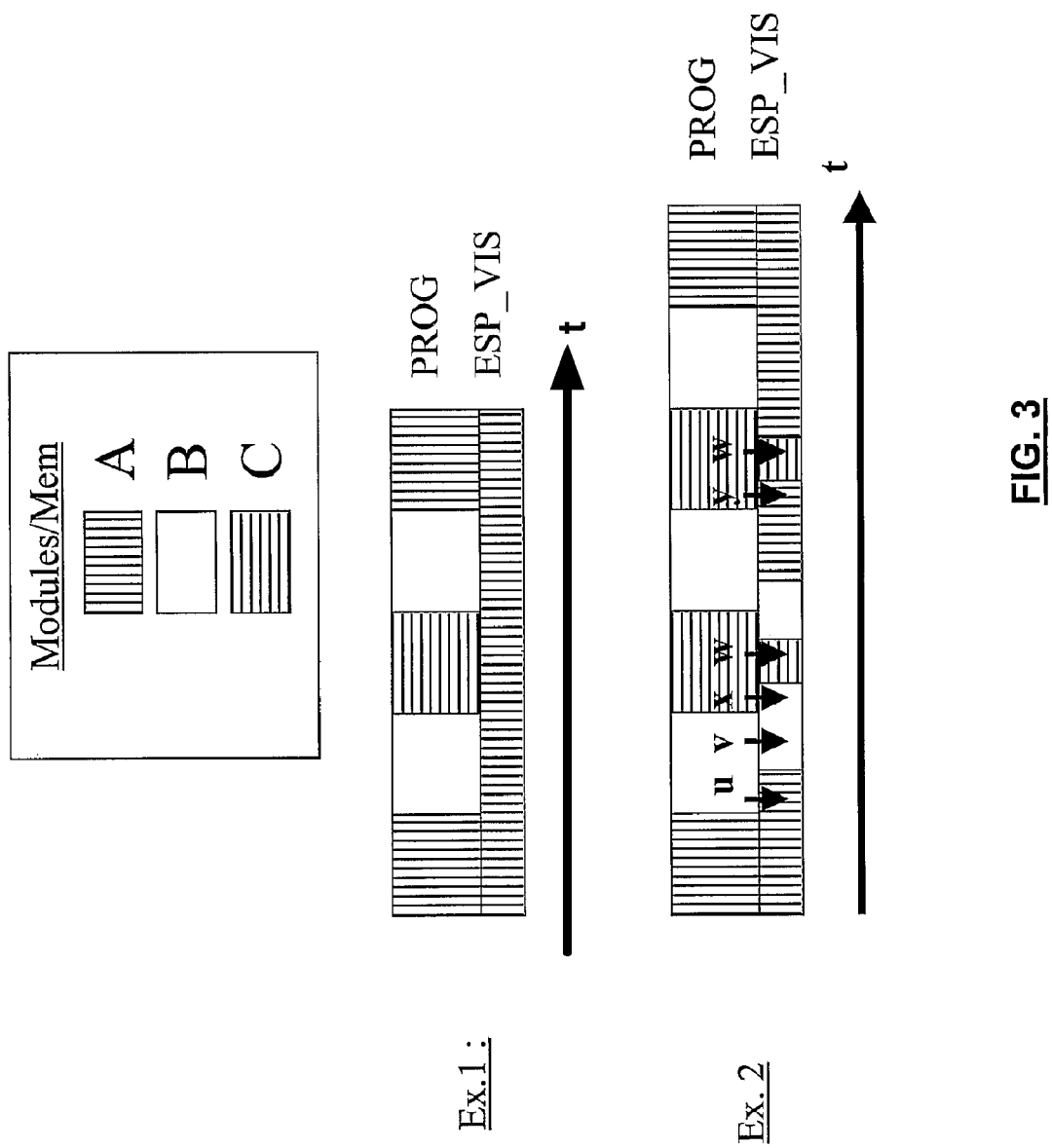
FIG. 3 is a diagrammatic representation of an example of chaining modules and memory areas which said modules attempt to access.

A security policy characteristic of the smartcard specifies that a module can only use, handle or access its own data or data corresponding to a module originating the task entrusted to the module. As shown by the first example (Ex. 1) on FIG. 3, a called module B inherits the privilege of accessing the data space of the task for which it is called, i.e., space which may belong to the calling module A or which the calling module B itself inherited. In the first example, the authorized space does not have to be updated since it does not change during the execution of a sequence including a call from A to B, a call from B to C, a return from C to B, and the return from B to A. The module may also (second example: Ex. 2) need to access its own data; in this case, the space authorized is updated using a request (explicit or implicit as illustrated on FIG. 5 and detailed below) by this module. When the module stops accessing its own data space, it returns to the previous context and again accesses the data space for which it received a privilege from the subcontracting call; the space authorized returns to its previous value using a request (explicit or implicit as illustrated on FIG. 5). In the second example, module B called by module A, accesses the data of module A (arrow u) and its own data (arrow v) in a transitory way. Module C, called by module B which was itself called by module A, accesses the data of module B (arrow x) or of module A (arrow y) and its own data (arrow w) in a transitory way.

Figure 4:
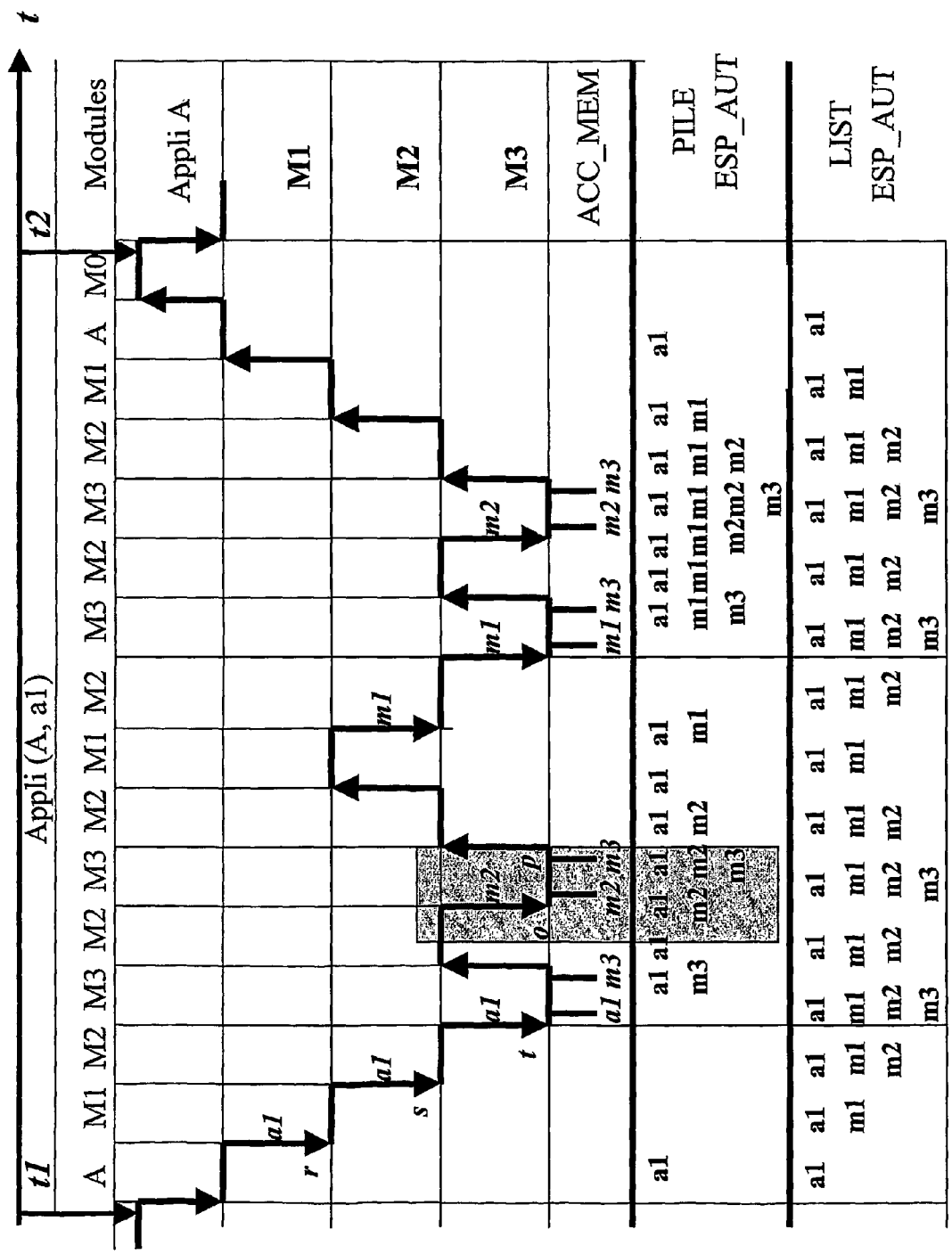
FIG. 4 is a diagram representing an example of chaining modules and memory areas which, said modules have the right to access.

The update step carried out to authorized the chaining of accesses to targeted spaces as described above is implemented according to various forms of realization illustrated on FIG. 4.

FIG. 4 represents, in the example illustrated, the calls between modules A, M1, M2, M3, the spaces targeted during the calls and the changes to authorized spaces during a given period (t1, t2).

According to a first form of realization, the update step can be carried out using a stack of authorized spaces (PILE ESP_AUT on FIG. 4). Each module 2 requests (either implicitly or explicitly) that its own data space is placed on or removed from the stack of authorized spaces, when that module needs to access its own data space. In the grayed-out part of FIG. 4 (letter "o"), before calling module M3 module M2 requests that its own space m2 is placed on the stack of authorized spaces. The stack then consists in the following spaces: a1 m2. Considering the update of the authorized space, module M3 can access space m2 (ACC_MEM). Module M3 then requests access (letter "p") to its own data m3; thus, M3's own space m3 is placed on the stack of authorized spaces. The stack then consists in the following spaces: a1 m2 m3. The access control device authorizes an operation on a data space when the data space targeted by the operation and the data space for which access is authorized at the time of the operation are identical: the data space authorized at the time of the comparison corresponds to the space at the top of the stack (according to the first example, i.e., at the letter "o" space m2; according to the second example, at the letter "p" space m3), those at the bottom of the stack (according to the first example space a1; according to the second example: spaces a1 m2) being spaces which have been and which will be again authorized spaces.

Note that the stack of authorized spaces may be quite different from the stack of calling modules; for example, therefore, if none of the called modules accesses its own data, the stack of authorized spaces is reduced to the data space of the first calling module (arrows r, s, t on FIG. 4—data space a1).

According to a second form of realization, a less rigorous security policy is set up. This update policy is implemented via a list type management mechanism: each module can request (either implicitly or explicitly) that its own data space is placed on or removed from the list of authorized spaces.

As illustrated simply on FIG. 4, each called module can potentially access its own data space and its data space is added to the list of authorized data spaces (LIST ESP_AUT). List handling is implicit and synchronized on the module calls. In this case, the list of authorized spaces is the same as the list of data spaces associated with the modules identified in the stack of calling modules to which is added the data space of the last called module.

The constraint is less rigorous than in the previous case: in fact, the update mechanism in the second form of realization allows the operation if there is agreement between the targeted space and one of the authorized spaces on the list. The mechanism therefore allows a calling module to access data of any of the modules called before the access control.

Figure 5:
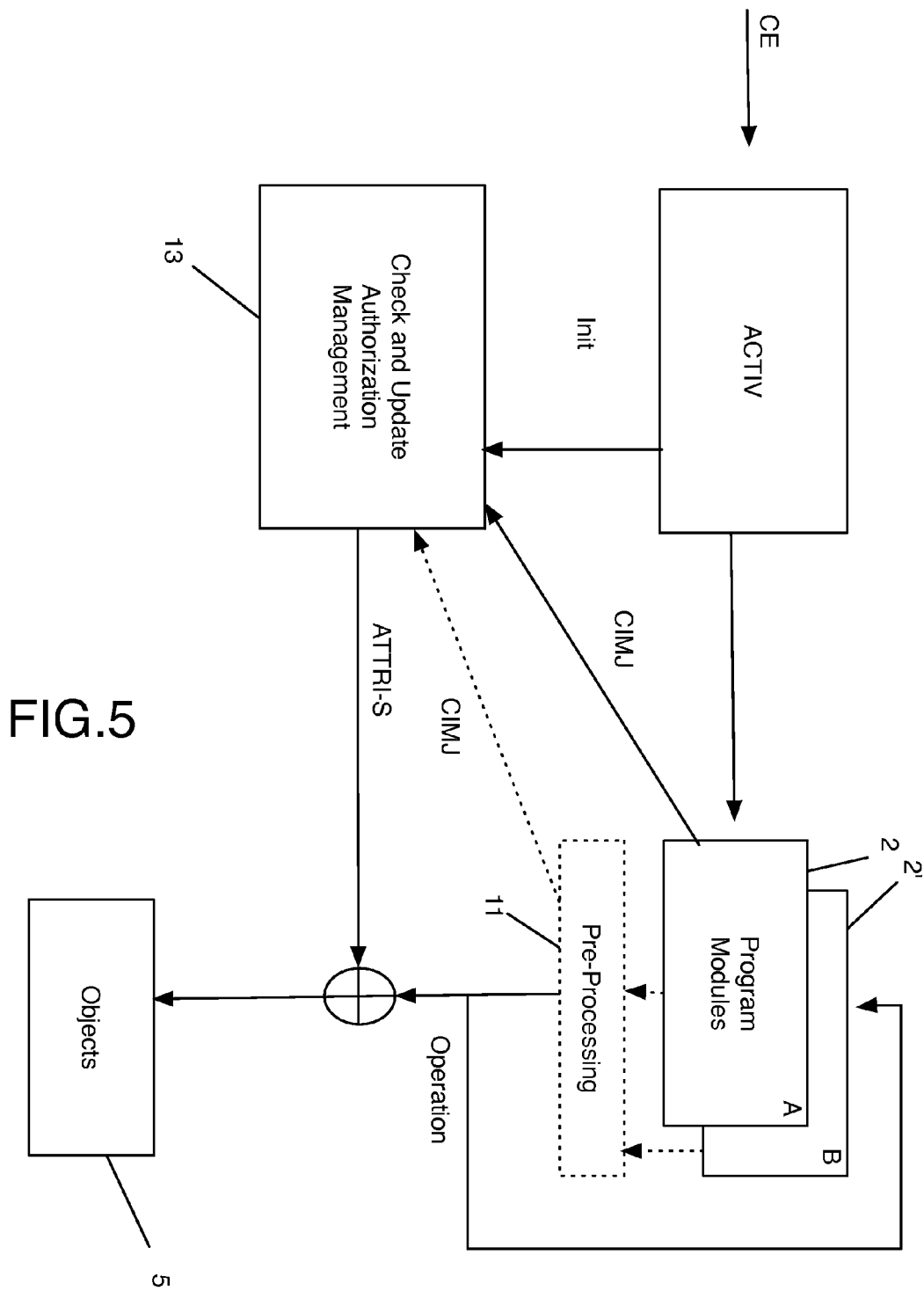
FIG. 5 is a flowchart illustrating the steps of the access control method according to FIG. 2 according to two realization variants, one shown in solid lines the other in solid and dotted lines.

According to a first variant of the update step illustrated on FIG. 5 in solid lines, the request made by a module 2 to add its data space to, or remove it from, the stack or the list of authorized spaces, is explicit: the request uses one or more internal update commands (CIMJ on FIG. 5) of type "add (or remove) my space" or "add (or remove) a given space".

According to another realization variant of the update step illustrated in solid and dotted lines on FIG. 5, the request made by a module 2 to add its data space to, or remove it from, the stack or the list of authorized spaces, is implicit. The request uses an internal update command (CIMJ) from a call interception or preliminary processing mechanism 11; said mechanism preliminary processing mechanism 11 requests addition (or removal) of the data space corresponding to the targeted space by the operation carried by the call to a called module (or the return to the calling module).

To update the active process attribute according to the active process status, or more particularly, to manage the information characterizing the data space associated with the status of the current processing, i.e., the authorized space, the management mechanism must process the update request corresponding to the change of active process status as shown on FIG. 2.

The protection offered by the access control depends on the level of security provided in the management of said access control mechanism. In order to increase the security in the access control management, an update management mechanism is planned as an identity check of the active process 3 and of its rights. The request to update the active process attribute 8 is only accepted and taken into account if its issuer, a module (in this case the active module or the interception module) is reliably identified and is authorized to make this request: the active process attribute update management mechanism comprises a mechanism 10 to check the identity of the requester of said attribute update and to check the rights of the requester.

The mechanism 10 must firstly identify the module making the update request and secondly ensure that the request is legal by checking the rights of the module on the targeted data space. The rights are data specific to the module concerned and saved beforehand.

As illustrated in FIG. 2, the identity check mechanism 10 and the initialize and update mechanism 9 may be performed in a sequence. Accordingly, for illustrative purposes, in FIGS. 5 and 6 these operations are grouped together as a check and update authorization management mechanism 13.

The identity of the calling module is generally obtained by identification of the calling program's program space. A patent application filed the same day as this application by the same applicant entitled "method and system for secured identification in a modular software architecture" describes such an identification mechanism.

If an explicit request is made like "add (or remove) a given space", the right of the program space on the data space in question is saved in memory, for example, in a table which connects program space(s) and multiple data space(s) according to the rights of the program spaces on the data spaces. This solution is suitable when data can be shared between several modules. For two or more modules to be able to share a data space, they simply have to share the right to update the authorized space by adding this shared data space.

More specifically, if an explicit request is made of type "add (or remove) my space", the correspondence between program space and data space must be saved in memory. This solution is suitable when there is bijection between program space and data space.

If the request is implicit, the right of the program space of the calling module with respect to the targeted data space must be saved in memory, for example in a table which connects program space(s) and multiple data space(s) as previously; the table will only be consulted if the targeted space differs from the existing authorized space.

Figure 6:
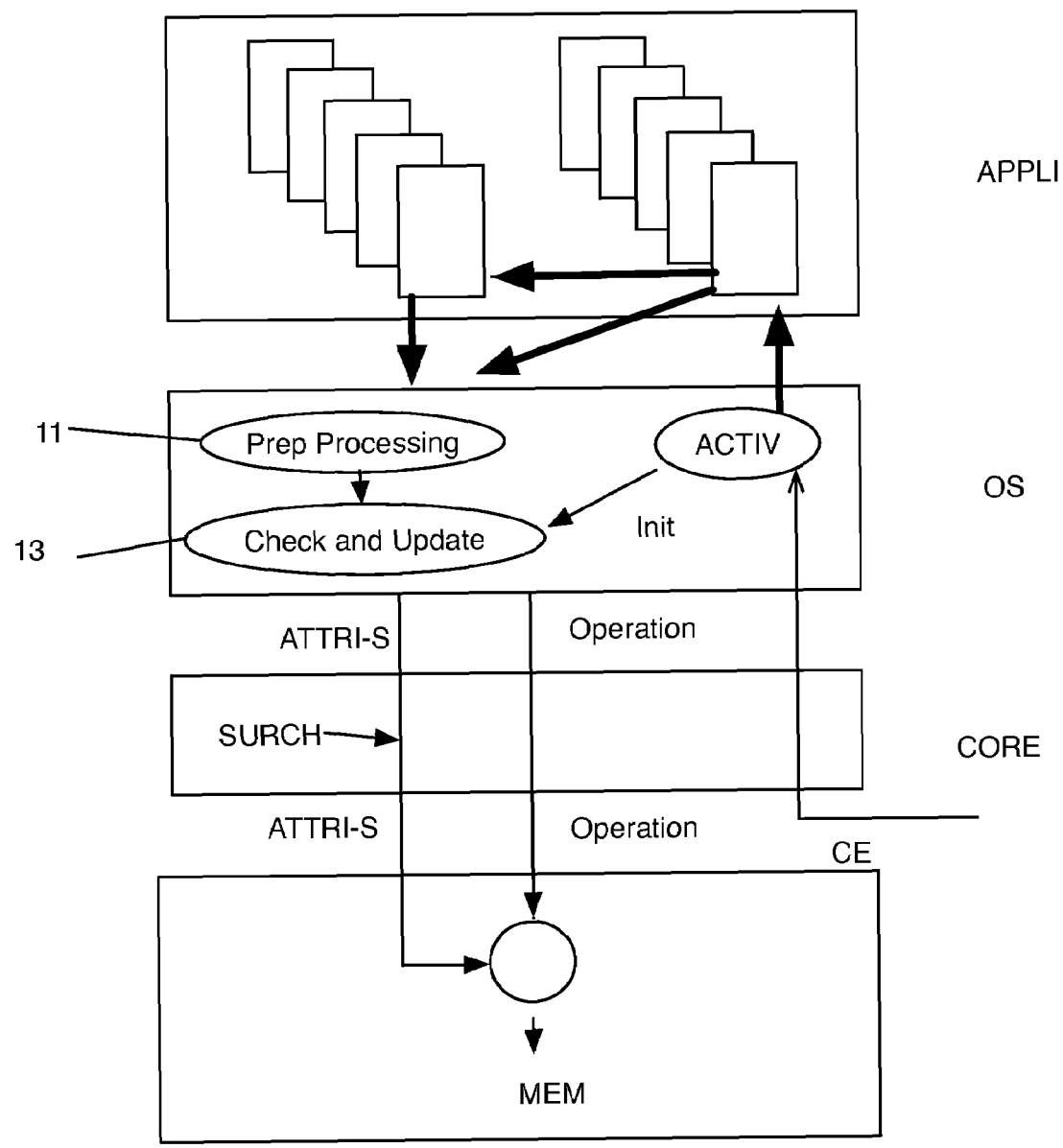
FIG. 6 is a diagram of the system according to FIG. 1, illustrating the access control method introduced in FIG. 2.

As shown on FIGS. 5 and 6, the mechanism 13 used to initialize and update the authorized space according to the invention is initiated by an external command CE. The external command activates ("ACTIV" on the figures) one of the modules 2 of system 1. Activation of one of said modules initializes ("Init") the authorized space to a particular value allowing the first module called by said external command to access the required memory area. When one module calls another module, the method according to the invention described above is executed.

The method according to the invention has been described in its application to control access to the data memory space. Similarly, the method according to the invention can be used to control access to the program memory space.

As an example, the case of a three-layer architecture like that which can be found in a smartcard is described below (FIG. 6).

In the case illustrated on FIG. 6, the comparison and action mechanism is implemented in the hardware at the level of memory access (MEM). By activating (ACTIV) the applications (APPLI), the operating system (OS) initializes the authorized space. The operating system (OS) comprises a call interception mechanism (11) which will implicitly notify to the management 13 of the authorized space, the space targeted by the call made to the system (which may be different from the initialized space if one application has called another). The management 13 of the authorized space identifies the calling application and modifies depending on the rights of said calling application the authorized space by giving the authorized space the value of the targeted space. The management function of the device is hierarchic, the core being able to modify the authorized space by overload (SURCH). When the update has been made, the active process attribute ATTRI-S 8 and the target object attribute ATTRI-O 7 are compared according to a given comparison rule, the type of operation and specific rules. The access required by the operation is accepted or rejected depending on the result of the comparison.

A special realization consists in implementing the comparison and action mechanism in the hardware; in this case, one method consists in transferring the top of the stack into a hardware register, another method consists in implementing the whole stack in the hardware. In architectures which are simple or with limited access control, the device management can itself be implemented with specific hardware.

All or part of the system described above can be realized in the hardware.

In addition, the set of modules of said system may take any other form and in particular, modules of said set can be grouped together or split to form new modules.

The system according to the invention is centralized and unique or hierarchic with separate comparison, action and management mechanisms.

This invention therefore concerns a method to control the access to objects 5 stored in a memory space of a computer system by an active process 3 stored in a program space of said system, said active process wanting to perform an operation on said objects 5, characterized in that the method controls the access to said objects 5 via a dynamic attribute 8 linked to said active process 3 whose value is updated according to the present and previous status of the active process 3.

The object attribute 7 is an item of information characterizing the memory area targeted by the operation carried out by the active process 3 and the active process attribute is an item of information characterizing the authorized memory space associated with the present and past status of the current processing program, i.e. the active process 3.

The dynamic attribute 8 is an item of information of type memory address(es) or an item of information of type identifier.

A module of the active process 3 explicitly requires the update of the dynamic attribute 8 or implicitly via an underlying call interception mechanism.

The invention claimed is:

1. An access control method for parts of a memory space of a computer system by an active process stored in a program memory space of said computer system, said active process performing an operation on said parts of the memory space, wherein the method comprises:
    controlling the access to at least one part of the memory space via a dynamic attribute linked to said active process;
    updating the value of the dynamic attribute according to the present and previous status of the active process;
    comparing an attribute linked to the target part of the memory space with the dynamic attribute linked to the active process;
    accepting the operation in response to the comparison indicating satisfaction of an acceptance criteria between the attribute linked to the targeted part of the memory space and the dynamic attribute linked to the active process; and
    rejecting the operation in response to the comparison indicating failure of an acceptance criteria between the attribute linked to the targeted part of the memory space and the dynamic attribute linked to the active process.

2. The access control method according to claim 1, further comprising:
    chaining inter-module call; and
    wherein the acceptance criteria comprises determining that the targeted memory space corresponds to a part of the memory space corresponding to at least one module in an inter-module chain of modules.

3. The access control method according to claim 1, wherein the dynamic-attribute is a stack including each module in a chain of modules from a chaining of inter-module calls having a most recently called module on top of the stack, and wherein the comparing step comprises determining whether the at least one part of the targeted memory space is in a data space corresponding to a module at the top of the stack.

4. The access control method according to claim 1, wherein the dynamic attribute is a list including each module in a chain of modules from a chaining of inter-module calls, and wherein the comparing step comprises determining whether the at least one part of the targeted memory space is in a data space corresponding to a module in said list.

5. The access control method according to claim 1, wherein the updating step comprises:
    checking the identity and the rights of a module being part of the active process;
    explicitly requesting the update of the dynamic attribute; and
    making said update if the module is authorised to update the dynamic attribute.

6. The access control method of claim 1 wherein the step of accepting or rejecting the access to said at least one part of the memory space further comprises accepting or rejecting access to said at least one part of the memory space according to the type of operation.

7. The access control method of claim 1 wherein at least one of the steps of accepting and rejecting the access to said at least one part of the memory space further comprises, respectively, accepting or rejecting access to said at least one part of the memory space according to predefined rules.

8. The access control method according to claim 1, wherein said method further comprises managing said update by checking the identity and the rights of a module being part of the active process and implicitly updating the dynamic attribute and making said update if the module is authorised to update the dynamic attribute.

9. A programmable storage media having computer program instructions for causing a data processing system to execute an access control method for parts of a data memory space, the program instructions comprising to cause the data processing system to:
    control the access to at least one part of the memory space via a dynamic attribute linked to said active process;
    update the value of the dynamic attribute according to the present and previous status of the active process;
    compare an attribute linked to the target part of the memory space with the dynamic attribute linked to the active process;
    accept the operation in response to the comparison indicating satisfaction of an acceptance criteria between the attribute linked to the targeted part of the memory space and the dynamic attribute linked to the active process; and
    reject the operation in response to the comparison indicating failure of an acceptance criteria between the attribute linked to the targeted part of the memory space and the dynamic attribute linked to the active process.

10. The programmable storage media having computer program instructions for causing a data processing system to execute an access control method according to claim 9, wherein said acceptance criteria comprises determining that the targeted memory space corresponds to a part of the memory space corresponding to at least one module in an inter-module chain of modules.

11. The programmable storage media having computer program instructions for causing a data processing system to execute an access control method according to claim 9, wherein the dynamic-attribute is a stack including each module in a chain of modules from a chaining of inter-module calls having a most recently called module on top of the stack, and wherein instructions to compare comprises determining whether the at least one part of the targeted memory space is in a data space corresponding to a module at the top of the stack.

12. The programmable storage media having computer program instructions for causing a data processing system to execute an access control method according to claim 9, wherein the dynamic attribute is a list including each module in a chain of modules from a chaining of inter-module calls, and wherein instructions to compare comprises determining whether the at least one part of the targeted data memory space is in a data space corresponding to a module in said list.

13. The programmable storage media having computer program instructions for causing a data processing system to execute an access control method according to claim 9, wherein the instructions to updated comprises instructions to cause the data processing system to:
- check the identity and the rights of a module being part of the active process;
- request the update of the dynamic attribute; and
- make said update only if the module is authorised to update the dynamic attribute.

* * * * *